United States Patent
Kumar et al.

(10) Patent No.: US 12,299,306 B2
(45) Date of Patent: May 13, 2025

(54) DEDUPLICATION BASED ON ARCHIVAL SCHEDULE

(71) Applicant: Dell Products L.P., Round Rock, TX (US)

(72) Inventors: Shiv S. Kumar, Pune (IN); Kaushik Gupta, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 274 days.

(21) Appl. No.: 18/170,385

(22) Filed: Feb. 16, 2023

(65) Prior Publication Data
US 2024/0281163 A1 Aug. 22, 2024

(51) Int. Cl.
*G06F 3/06* (2006.01)

(52) U.S. Cl.
CPC .......... *G06F 3/0641* (2013.01); *G06F 3/0608* (2013.01); *G06F 3/067* (2013.01)

(58) Field of Classification Search
CPC ....... G06F 3/0641; G06F 3/0608; G06F 3/067
See application file for complete search history.

(56) References Cited

U.S. PATENT DOCUMENTS 8,095,756 B1 * 1/2012 Somavarapu ....... G06F 11/1461
711/163

* cited by examiner

*Primary Examiner* — Kenneth M Lo
*Assistant Examiner* — Han V Doan
(74) *Attorney, Agent, or Firm* — Amin, Turocy & Watson, LLP

(57) ABSTRACT

A system can identify a first group of files that are scheduled to be modified by another operation within a next defined amount of time. The system can remove the first group of files from the files of the file system with respect to a deduplication operation to produce a second group of files. The system can perform a sampling phase on the second group of files, wherein the sampling phase identifies a first group of blocks, and wherein the first group of blocks corresponds to duplicate file system blocks. The system can identify a second group of blocks that correspond to the first group of files. The system can remove any blocks from the first group of blocks that have a respective duplicate in the second group of blocks to produce a third group of blocks. The system can perform the deduplication operation on the third group of blocks.

20 Claims, 11 Drawing Sheets

600

(602)

↓

IN RESPONSE TO DETERMINING TO PERFORM A DEDUPLICATION OPERATION ON FILES OF A FILE SYSTEM, IDENTIFYING A FIRST GROUP OF FILES THAT ARE SCHEDULED TO BE MODIFIED BY ANOTHER OPERATION WITHIN A NEXT DEFINED AMOUNT OF TIME, WHEREIN THE OTHER OPERATION DIFFERS FROM THE DEDUPLICATION OPERATION 604

↓

REMOVING THE FIRST GROUP OF FILES FROM THE FILES OF THE FILE SYSTEM WITH RESPECT TO THE DEDUPLICATION OPERATION TO PRODUCE A SECOND GROUP OF FILES OF THE FILE SYSTEM 606

↓

PERFORMING A SAMPLING PHASE ON THE SECOND GROUP OF FILES, WHEREIN THE SAMPLING PHASE IDENTIFIES A FIRST GROUP OF BLOCKS, AND WHEREIN THE FIRST GROUP OF BLOCKS CORRESPONDS TO DUPLICATE FILE SYSTEM BLOCKS AMONG THE SECOND GROUP OF FILES 608

↓

IDENTIFYING A SECOND GROUP OF BLOCKS THAT CORRESPOND TO THE FIRST GROUP OF FILES 610

↓

REMOVING ANY BLOCKS FROM THE FIRST GROUP OF BLOCKS THAT HAVE A RESPECTIVE DUPLICATE IN THE SECOND GROUP OF BLOCKS TO PRODUCE A THIRD GROUP OF BLOCKS 612

↓

PERFORMING THE DEDUPLICATION OPERATION ON THE THIRD GROUP OF BLOCKS 614

SENDING, TO A COMPONENT THAT IS CONFIGURED TO PERFORM THE OTHER OPERATION, AN APPLICATION PROGRAMMING INTERFACE COMMAND REQUESTING THE FILES THAT ARE SCHEDULED TO BE MODIFIED WITHIN THE NEXT DEFINED AMOUNT OF TIME 704

RECEIVING AN INDICATION OF THE FIRST GROUP OF FILES FROM THE COMPONENT 706

IDENTIFYING A FIRST GROUP OF FILES OF A FILE SYSTEM THAT ARE SCHEDULED TO BE MODIFIED WITHIN A SPECIFIED AMOUNT OF TIME RELATIVE TO A CURRENT TIME 1004

▼

IDENTIFYING A SECOND GROUP OF FILES OF THE FILE SYSTEM THAT DOES NOT COMPRISE THE FIRST GROUP OF FILES 1006

▼

IDENTIFYING A FIRST GROUP OF BLOCKS BASED ON PERFORMING SAMPLING ON THE SECOND GROUP OF FILES 1008

▼

IDENTIFYING A SECOND GROUP OF BLOCKS THAT CORRESPOND TO THE FIRST GROUP OF FILES 1010

▼

REMOVING BLOCKS FROM THE FIRST GROUP OF BLOCKS THAT HAVE A DUPLICATE BLOCK IN THE SECOND GROUP OF BLOCKS TO PRODUCE A THIRD GROUP OF BLOCKS 1012

▼

PERFORMING A DEDUPLICATION OPERATION ON THE THIRD GROUP OF BLOCKS 1014

DEDUPLICATION BASED ON ARCHIVAL SCHEDULE

BACKGROUND

Data protection operations can be performed on data that is stored by a computer. There can be different types of data protection operations performed on one computer's data, and these different types of data protection operations can run on different schedules.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can, in response to determining to perform a deduplication operation on files of a file system, identify a first group of files that are scheduled to be modified by another operation within a next defined amount of time, wherein the other operation differs from the deduplication operation. The system can remove the first group of files from the files of the file system with respect to the deduplication operation to produce a second group of files of the file system. The system can perform a sampling phase on the second group of files, wherein the sampling phase identifies a first group of blocks, and wherein the first group of blocks corresponds to duplicate file system blocks among the second group of files. The system can identify a second group of blocks that correspond to the first group of files. The system can remove any blocks from the first group of blocks that have a respective duplicate in the second group of blocks to produce a third group of blocks. The system can perform the deduplication operation on the third group of blocks.

An example method can comprise identifying, by a system comprising a processor, a first group of files of a file system that are scheduled to be modified within a predetermined amount of time relative to a current time. The method can further comprise identifying, by the system, a second group of files of the file system that represent files of the file system not identified in the first group of files. The method can further comprise performing, by the system, a sampling phase on the second group of files to identify a first group of blocks. The method can further comprise identifying, by the system, a second group of blocks that correspond to the first group of files. The method can further comprise removing, by the system, blocks from the first group of blocks that have a duplicate in the second group of blocks to produce a third group of blocks. The method can further comprise performing, by the system, a deduplication operation on the third group of blocks.

An example non-transitory computer-readable medium can comprise instructions that, in response to execution, cause a system comprising a processor to perform operations. These operations can comprise identifying a first group of files of a file system that are scheduled to be modified within a specified amount of time relative to a current time. These operations can further comprise identifying a second group of files of the file system that does not comprise the first group of files. These operations can further comprise identifying a first group of blocks based on performing sampling on the second group of files. These operations can further comprise identifying a second group of blocks that correspond to the first group of files. These operations can further comprise removing blocks from the first group of blocks that have a duplicate block in the second group of blocks to produce a third group of blocks. These operations can further comprise performing a deduplication operation on the third group of blocks.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates another example process flow that can facilitate deduplication based on archival schedule, in accordance with an embodiment of this disclosure;

FIG. 7 illustrates another example process flow that can facilitate deduplication based on archival schedule, in accordance with an embodiment of this disclosure;

FIG. 10 illustrates another example process flow that can facilitate deduplication based on archival schedule, in accordance with an embodiment of this disclosure;

DETAILED DESCRIPTION

Overview

Figure 1:
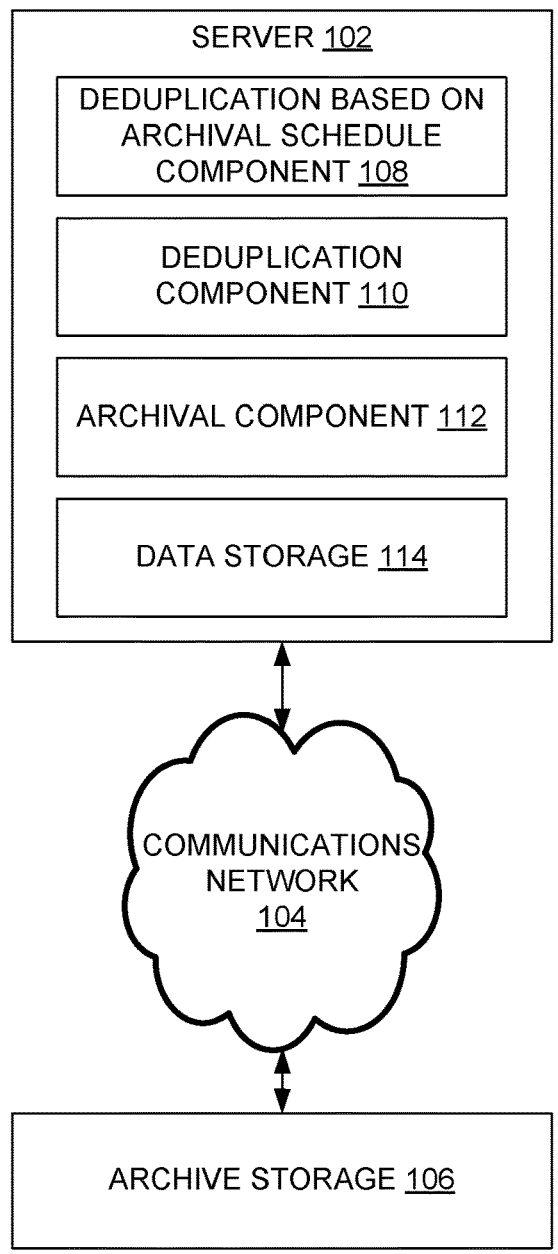
FIG. 1 illustrates an example system architecture that can facilitate deduplication based on archival schedule, in accordance with an embodiment of this disclosure.

The examples herein generally relate to deduplication in a context where archival of files occur. It can be appreciated that the present techniques can be applied to other scenarios, such as more generally, deduplication in a context where operations to modify data (which can take a variety of forms, such as files, data objects, or data blocks) occur.

The following example considers a home directory workflow. User A writes a video file that has a size of 1 gigabyte (GB) to the user's home directory in storage. User A reads this file multiple times in one week, then does not access it.

The file remains in User A's home directory for a year and becomes a cold file (e.g., a file that has not been accessed for a threshold amount of time).

One year after User A wrote the file to its home directory, User B writes the same video file to its home directory in storage. At this point, it can be considered that User A's file is cold while User B's file is hot (e.g., the file has been accessed within a most-recent threshold amount of time).

An administrator can execute a deduplication job across home directories, where, when more than one copy of a file is stored, the additional copies can be deleted (and replaced with a reference to the one copy), which can free storage resources. In this deduplication job, as both User A and User B are storing the same file, one copy can be deleted. This can result in reclaiming storage resources in exchange for using processing resources to run the deduplication job.

In addition to the deduplication process, and after the deduplication process completes (e.g., 2 hours afterward), it can be that a scheduled archive process can run to archive User A's copy of the file to cloud storage, as per a defined policy.

In this scenario, it can appear that deduplication is effective. However, it can be that deduplication was an expensive process (in terms of processing resources consumed) without any storage gain, because the storage resources that the deduplication process reclaimed were going to be soon reclaimed by the archive process, anyway.

Prior approaches can ignore an archival job schedule in performing deduplication.

According to the present techniques, a way to address this problem of wasted resources can be for a deduplication process to be aware of archive jobs that will execute in the near future, facilitating the deduplication process to not spend processing resources on files that are going to be archived soon. "Soon" can be a configurable amount of time.

In the above example, a deduplication process according to the present techniques can exclude User A's file from deduplication because it is going to be archived in 2 hours. It can be that all other files are part of the deduplication job.

While the present techniques generally relate to file-level deduplication, it can be appreciated that they can be applied to other scenarios, such as block-level deduplication and archive.

In some examples, the present techniques can be implemented as follows. Where a file is going to be archived in the near future, it can be skipped in a deduplication job.

A deduplication job can comprise four phases: sampling, commonality detection, sharing, and index update.

After a sampling phase, files that will be archived in the next X hours can be identified and removed from further deduplication processing in the subsequent phases. As such, the subsequent phases can avoid spending processing resources on blocks of files that will be archived in the near future.

An index table (which can be a data structure that identifies blocks of files that are candidates for a deduplication operation) can remove blocks of files that are getting archived in the next X hours. When a deduplication job starts, a list of files can be fetched from an archive library (which can expose an application programming interface (API) to an archive component, where the API can be invoked to identify which files in a given file system path will be archived in the next X amount of time) that will be archived in the next X hours. The archive library can look up archive policies present at that point in time, and produce a list of files that will be archived in the next X days. In a sampling phase, these files identified by the archive library can be skipped from being processed.

Blocks of files identified by the archive library can be retrieved. These blocks can be removed from the index table. A result of this approach can be to save on processing resources by not processing files for deduplication that will soon be archived.

An archive library can expose an application programming interface (API) that accepts a number of hours (X), and returns a list of files that will be archived in the next X hours. The archive library can analyze archive policies and determine a path of files that will be archived in the next X hours.

Example Architecture

FIG. 1 illustrates an example system architecture 100 that can facilitate deduplication based on archival schedule, in accordance with an embodiment of this disclosure.

System architecture 100 comprises server 102, communications network 104, and archival storage 106. In turn, server 102 comprises deduplication based on archival schedule component 108, deduplication component 110, archival component 112, and data storage 114.

Figure 11:
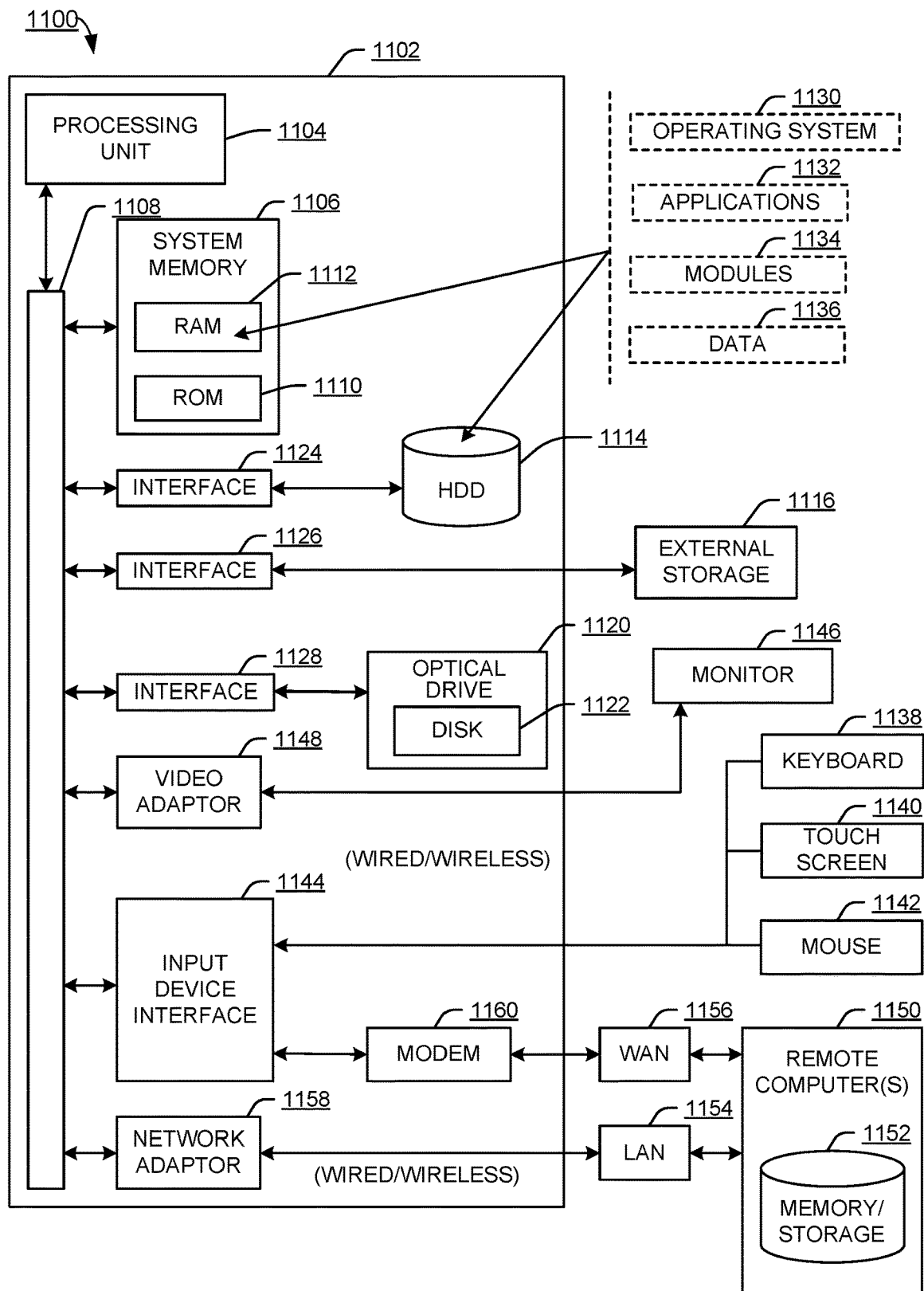
FIG. 11 illustrates an example block diagram of a computer operable to execute an embodiment of this disclosure.

Each of server 102 and/or archival storage 106 can be implemented with part(s) of computing environment 1100 of FIG. 11. Communications network 104 can comprise a computer communications network, such as the Internet.

Server 102 can store computer data in data storage 114 (e.g., on a hard drive). Deduplication component 110 can be configured to perform deduplication operations on data storage 114, and archival component 112 can be configured to perform archival operations on data storage 114.

Deduplication based on archival schedule component 108, deduplication component 110 is portrayed logically, and it can be appreciated that there can be other architectures that implement the present techniques. For example, there can be architectures where each of deduplication component 110 and archival component 112 are configured to implement part(s) of the present techniques without an involvement of deduplication based on archival schedule component 108.

Deduplication based on archival schedule component 108 can be configured to consider an archival schedule by archival component 112 into consideration when deduplication component 110 performs a deduplication operation. In some examples, deduplication based on archival schedule component 108 can cause deduplication component 110 not to perform deduplication operations on data that will be archived by archival component 112 within a predetermined amount of time from the present time—e.g., within the next 2 hours.

In some examples, deduplication based on archival schedule component 108 can implement part(s) of the process flows of FIGS. 3-10 to implement deduplication based on archival schedule. In some examples, deduplication based on archival schedule component 108 can consider part(s) of system architecture 200 of FIG. 2 in implementing deduplication based on archival schedule.

It can be appreciated that system architecture 100 is one example system architecture for deduplication based on archival schedule, and that there can be other system architectures that facilitate deduplication based on archival schedule.

Figure 2:
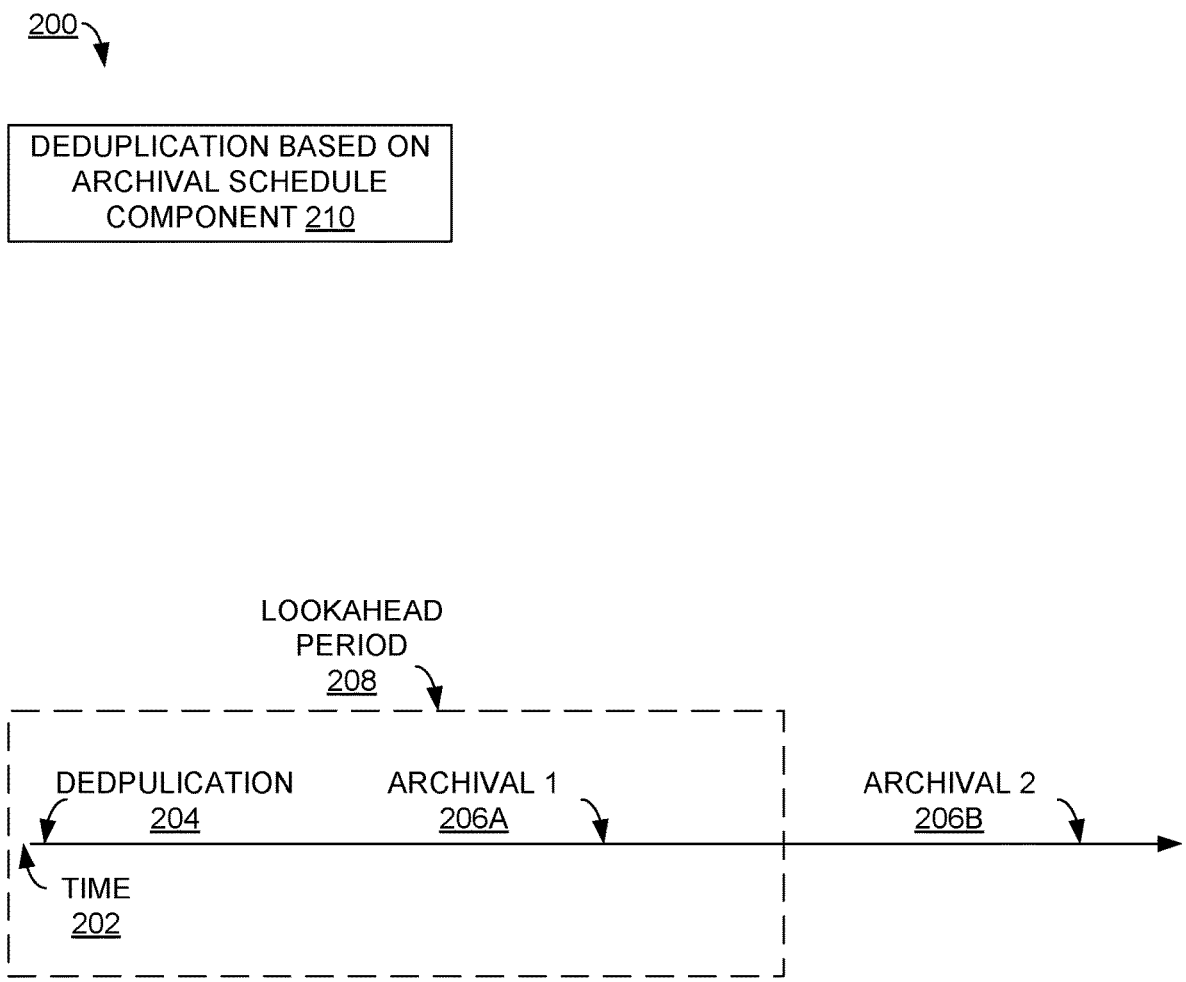
FIG. 2 illustrates another example system architecture of deduplication and archive operations that can facilitate deduplication based on archival schedule, in accordance with an embodiment of this disclosure.

FIG. 2 illustrates an example system architecture 200 of deduplication and archive operations that can facilitate deduplication based on archival schedule, in accordance with an embodiment of this disclosure. In some examples, part(s) of system architecture 200 can be used by deduplication based on archival schedule component 108 of FIG. 1 to facilitate deduplication based on archival schedule.

System architecture 200 comprises time 202, deduplication 204, archival 1 206A, archival 2 206B, lookahead period 208, and deduplication based on archival schedule component 210 (which can be similar to deduplication based on archival schedule component 108 of FIG. 1).

Time 202 can represent the passage of time, where 0 is the present time, and where certain operations (e.g., deduplication 204) can occur at certain times. Deduplication 204 represents performing a deduplication operation, such as one performed by deduplication component 110 of FIG. 1.

Archival 1 206A and archival 2 206B each represent performing an archival operation, such as one performed by archival component 112 of FIG. 1. In some examples, archival 1 206A and archival 2 206B can implement a same archival policy (e.g., repeatedly perform an archive operation for a given archive policy every X hours). In some examples, archival 1 206A and archival 2 206B can implement different archive policies (e.g., archival 1 206A implements archival policy 1 on files X, and archival 2 206B implements archival policy 2 on files Y).

Lookahead period 208 represents a lookahead period for deduplication 204. Archival operations that fall within lookahead period 208 can be considered in performing deduplication 204. As depicted, archival 1 206A falls within lookahead period 208, while archival 2 206B does not. Given that, when performing deduplication 204, files that will be archived as part of archival 1 206A can be excluded from deduplication 204. And if there are files that will be archived as part of archival 2 206A, then deduplication 204 can still perform a deduplication operation on these files.

Example Process Flows

Figure 3:
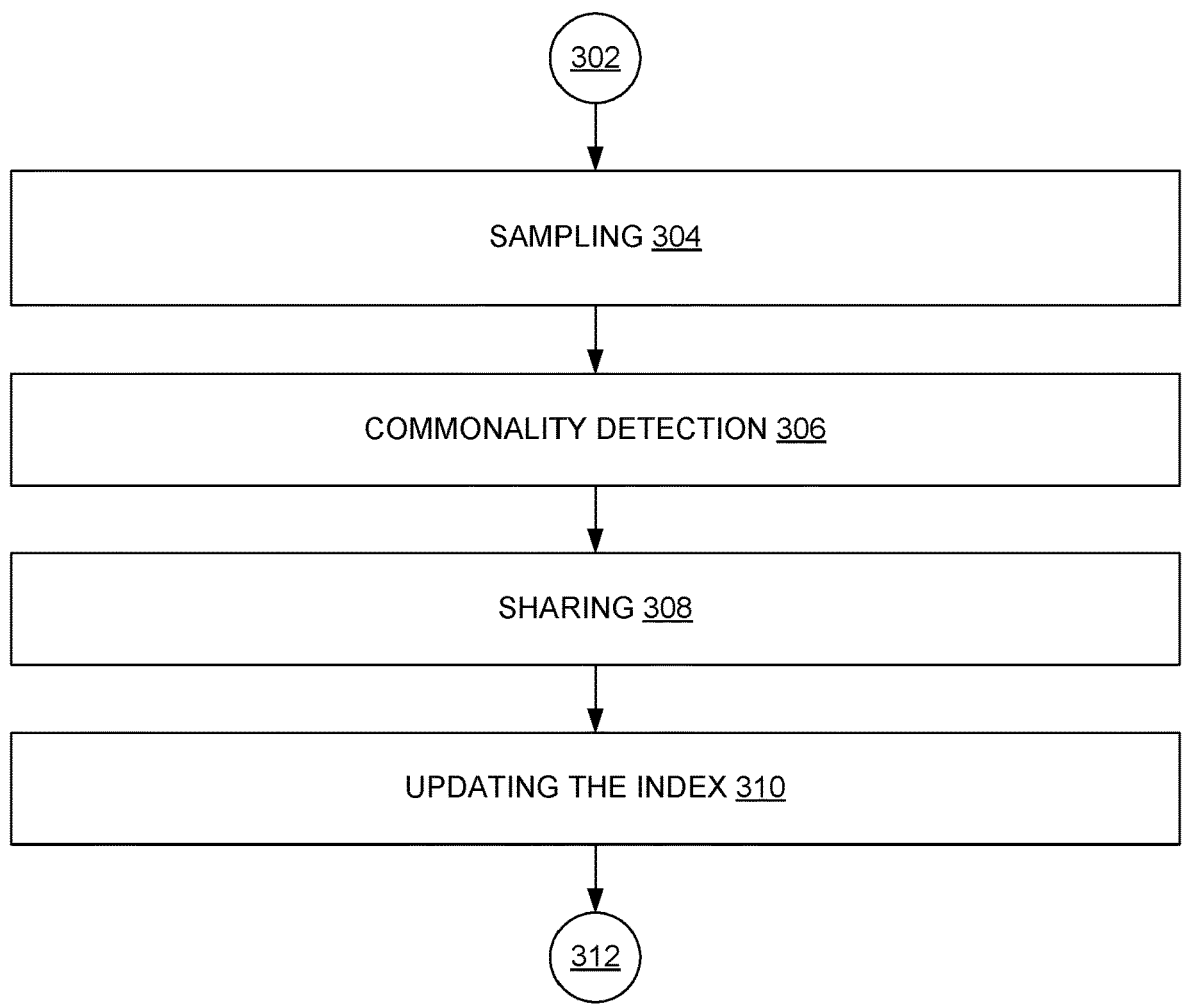
FIG. 3 illustrates example process flow that can facilitate deduplication based on archival schedule, in accordance with an embodiment of this disclosure.

FIG. 3 illustrates an example process flow 300 that can facilitate deduplication based on archival schedule, in accordance with an embodiment of this disclosure. In some examples, one or more embodiments of process flow 300 can be implemented by deduplication based on archival schedule component 108 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

In some examples, process flow 300 represents operating procedures performed by deduplication based on archival schedule component 108 of FIG. 1, in conjunction with deduplication component 110, to perform deduplication based on archival schedule.

Process flow 300 begins with 302, and moves to operation 304.

Operation 304 depicts sampling. In some examples, deduplication based on archival schedule component 108 can perform a tree-walk of files that are to be considered for deduplication to collect deduplication candidates for each file. Sampling can involve analyzing a subset of data blocks of a file—e.g., one of every sixteen data blocks—where deduplication candidate files that have matching sampled blocks can have all their blocks analyzed subsequently. Sampling can then involve generating a key-value pair consisting of an identifier of a value stored in the block (e.g., a hash value) and storing this in an index table data structure. Once a file has been sampled, it can be that the file is marked as sampled, and not rescanned unless it has been subsequently modified.

In applying the present techniques, as part of operation 304, files that will be archived in the next N hours can be identified and removed from consideration in operations 306-310. This can conserve processing resources by not using processing resources to analyze (as part of deduplication) blocks of files that will be removed in the next N hours. A way to do this can be to remove such blocks of files from the index table.

After operation 304, process flow 300 moves to operation 306.

Operation 306 depicts commonality detection. This can involve scanning the index table for hashes that match those of candidate blocks for deduplication. Where index entries of two files match, a request entry can be generated that indicates that deduplication is to be performed. In some examples, a request entry comprises pre- and post-limit information that indicates a number of blocks before and after the matching block that can be searched for a matching data chunk. In some examples where data protection groups are implemented, these values can correspond to a protection group's boundaries.

After operation 306, process flow 300 moves to operation 308.

Operation 308 depicts sharing. This can be referred to as block sharing, and can comprise calling a shadow store library to share duplicated blocks. Sharing duplicated blocks can comprise writing matching data to a common shadow store data structure, and creating references from the original files to the shadow store.

After operation 308, process flow 300 moves to operation 310.

Operation 310 depicts updating the index. Updating the index can comprise updating the index table with sampled and matching block information determined in operations 304-308. For example, where a file is scanned (e.g., sampled) as part of a deduplication operation, and no matching blocks in other files are identified, index entries for that file can be removed from the index file, where it is determined that such a file is unlikely to have duplicate matches. Additionally, each file that was scanned can be marked as scanned, and this can indicate not to rescan the file until it has been modified.

After operation 310, process flow 300 moves to 312, where process flow 300 ends.

Figure 4:
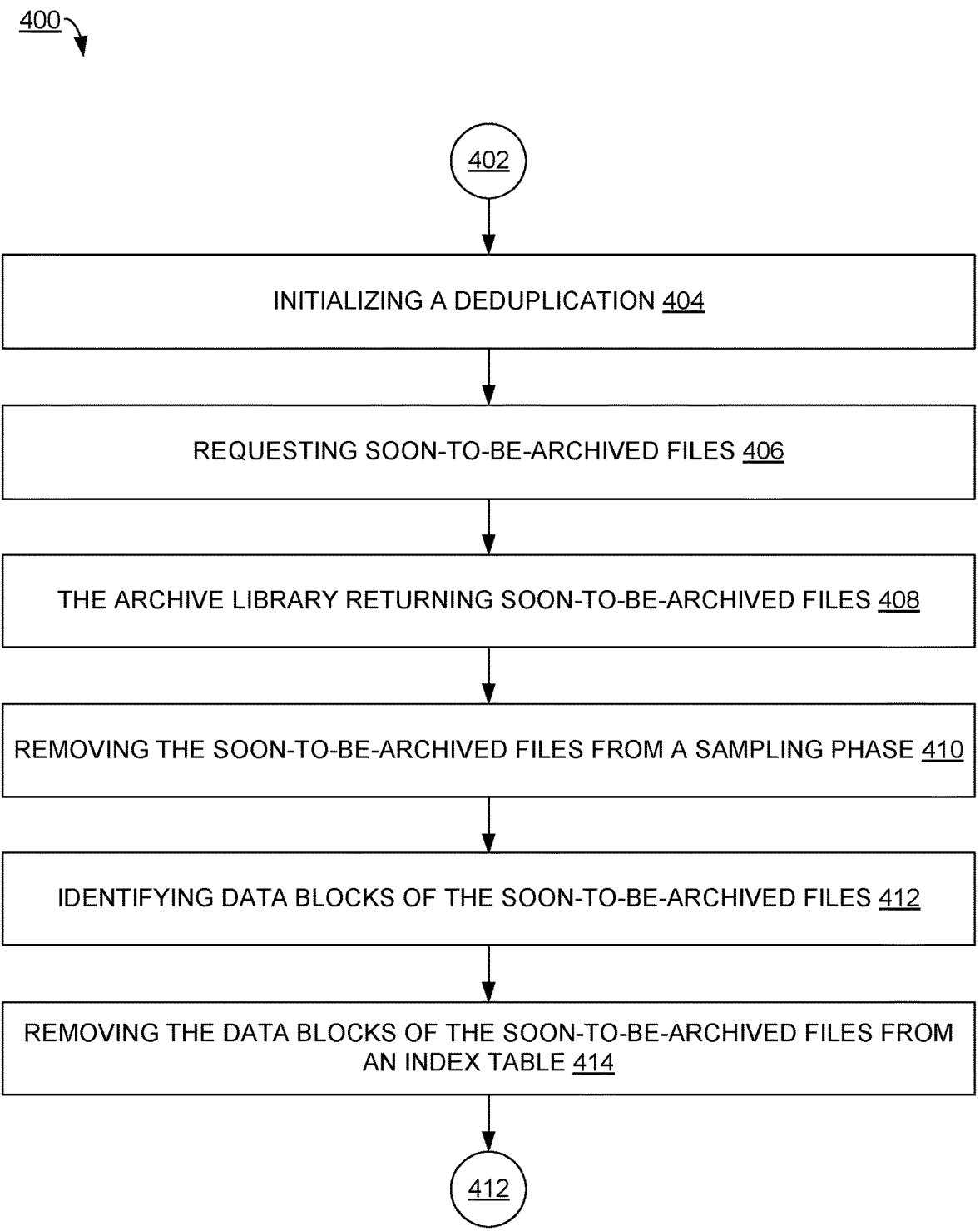
FIG. 4 illustrates another example process flow that can facilitate deduplication based on archival schedule, in accordance with an embodiment of this disclosure.

FIG. 4 illustrates an example process flow 400 that can facilitate deduplication based on archival schedule, in accordance with an embodiment of this disclosure. In some examples, one or more embodiments of process flow 400 can be implemented by deduplication based on archival schedule component 108 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

In some examples, process flow 400 represents operating procedures performed by deduplication based on archival schedule component 108 of FIG. 1, in conjunction with deduplication component 110, to perform deduplication based on archival schedule.

Process flow 400 begins with 402, and moves to operation 404.

Operation 404 depicts initializing a deduplication. This can comprise deduplication component 110 of FIG. 1 starting a deduplication operation on data storage, such as on a schedule (e.g., once per day).

After operation 404, process flow 400 moves to operation 406.

Operation 406 depicts requesting soon-to-be-archived files. This can comprise deduplication based on archival schedule component 108 sending an application programming interface (API) call to archival component 112 that indicates a request for files that will be archived, along with a parameter that specifies an amount of time in the future to look (e.g., the next 2 hours). In some examples, the API call can identify a file system path, where files that are in that path are analyzed, rather than an entire file system being analyzed.

After operation 406, process flow 400 moves to operation 408.

Operation 408 depicts the archive library returning soon-to-be-archived files. This can comprise archival component 112 processing the API call from operation 406 to identify relevant files and returning an identifier of those files, such as in a list of file system paths to those files (e.g., /usr/jdoe/file1).

After operation 408, process flow 400 moves to operation 410.

Operation 410 depicts removing the soon-to-be-archived files from a sampling phase. That is, in a sampling phase that can be similar to operation 304 of FIG. 3, soon-to-be-archived files identified in operation 408 can be excluded from the sampling phase.

After operation 410, process flow 400 moves to operation 412.

Operation 412 depicts identifying data blocks of the soon-to-be-archived files. These can be the data blocks of data storage 114 that store data of the soon-to-be-archived files. In some examples, a file system represents data as files, and the file system is stored on storage that divides data into data blocks (e.g., 512 bytes of data).

After operation 412, process flow 400 moves to operation 414.

Operation 414 depicts removing the data blocks of the soon-to-be-archived files from an index table. That is, data blocks identified in operation 412 can be removed from the index table. Then, when a deduplication operation performs commonality detection, like in operation 306 of FIG. 3, processing resources can be conserved by not performing commonality detection on files that will soon be archived anyway (which can make a deduplication operation on those files moot).

After operation 414, process flow 400 moves to 416, where process flow 400 ends.

Figure 5:
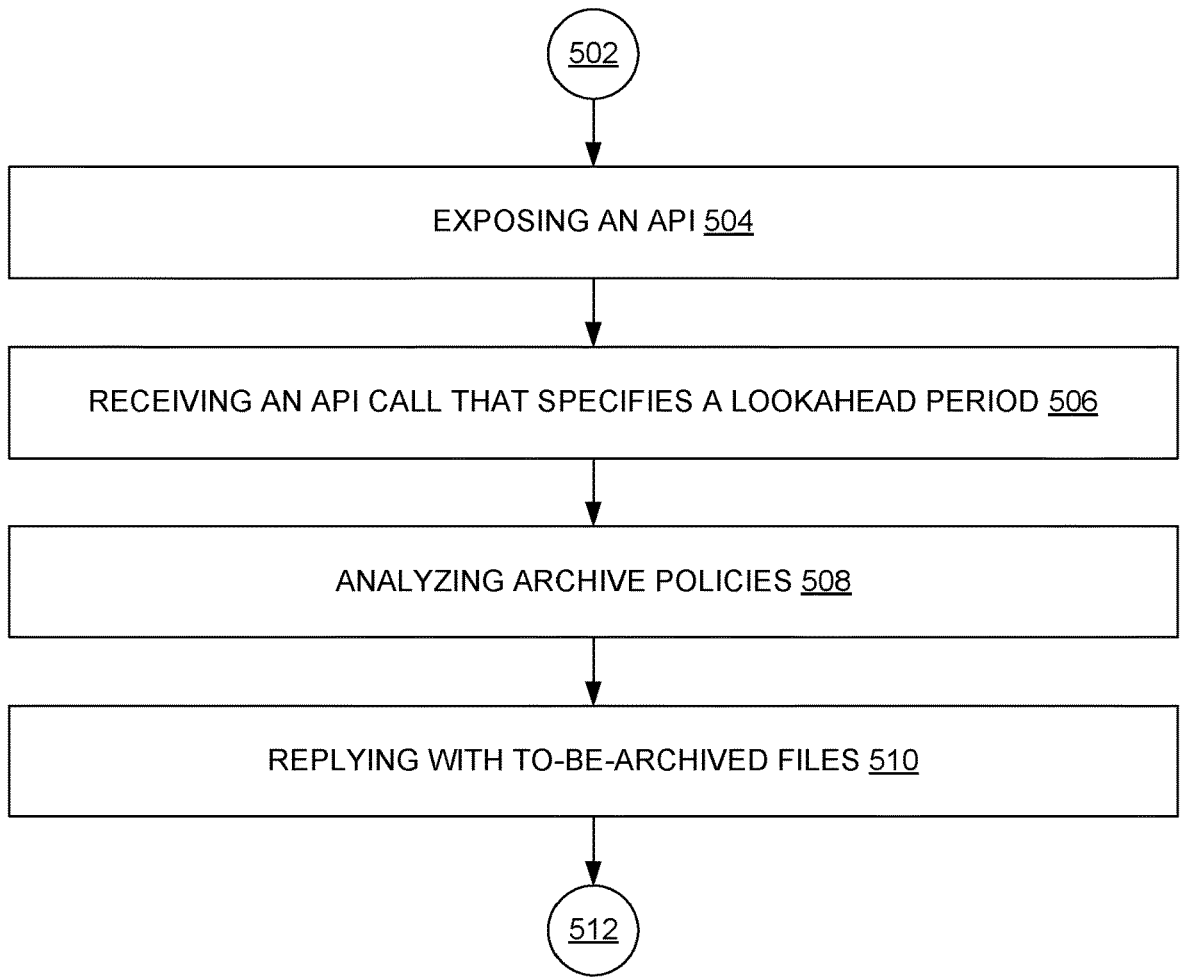
FIG. 5 illustrates another example process flow that can facilitate deduplication based on archival schedule, in accordance with an embodiment of this disclosure.

FIG. 5 illustrates an example process flow 500 that can facilitate deduplication based on archival schedule, in accordance with an embodiment of this disclosure. In some examples, one or more embodiments of process flow 500 can be implemented by deduplication based on archival schedule component 108 of FIG. 1, in conjunction with archival component 112, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, process flow 900 of FIG. 9, and/or process flow 1000 of FIG. 10.

In some examples, process flow 300 represents operating procedures performed by archival component 112 of FIG. 1 to perform deduplication based on archival schedule.

Process flow 500 begins with 502, and moves to operation 504.

Operation 504 depicts exposing an API. This can comprise archival component 112 of FIG. 1 exposing an API so that other entities can make API calls to archival component 112, requesting an identification of files that will be archived by archival component 112 in a defined time period.

After operation 504, process flow 500 moves to operation 506.

Operation 506 depicts receiving an API call that specifies a lookahead period. This can comprise deduplication component 110 of FIG. 1 making the API call to archival component 112, where the API call specifies a lookahead period (which can be similar to lookahead period 208 of FIG. 2).

After operation 506, process flow 500 moves to operation 508.

Operation 508 depicts analyzing archive policies. archival component 112 of FIG. 1 can be configured to perform archives according to multiple different policies (e.g., a first archive policy specifies to perform archives of data stored in a first portion of data storage 114 weekly, while a second archive policy specifies to perform archives of data stored in a second portion of data storage 114 monthly). archival component 112 can analyze these policies to determine which files are scheduled to be archived during the lookahead period specified in operation 508.

After operation 508, process flow 500 moves to operation 510.

Operation 510 depicts replying with to-be-archived files. This can comprise archival component 112 of FIG. 1 returning to deduplication component 110 a list if files identified in operation 508. In some examples, this list of files can comprise a list of file system paths to the files.

After operation 508, process flow 500 moves to 512, where process flow 500 ends.

FIG. 6 illustrates an example process flow 600 that can facilitate deduplication based on archival schedule, in accordance with an embodiment of this disclosure. In some examples, one or more embodiments of process flow 600 can be implemented by deduplication based on archival schedule component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts, in response to determining to perform a deduplication operation on files of a file system, identifying a first group of files that are scheduled to be modified by another operation within a next defined amount of time, wherein the other operation differs from the deduplication operation. That is, a deduplication operation can be initiated. The other operation can comprise an operation that modifies files subject to the deduplication, such as an archive or delete operation, where the other operation is scheduled to be performed at some known point in the future—e.g., within the next N hours.

In some examples, operation 604 comprises identifying respective file system paths of respective files of the first group of files. That is, an API call to a process that performs the other operation (e.g., an archive process) can return paths to each file that will be modified by that operation.

In some examples, a component is scheduled to modify the first group of files, and the component is configured to perform operations on a defined schedule. That is, the component that performs the other operation can operate on its own schedule that is separate from a schedule for performing a deduplication.

After operation 604, process flow 600 moves to operation 606.

Operation 606 depicts removing the first group of files from the files of the file system with respect to the deduplication operation to produce a second group of files of the file system. That is, to-be-modified (e.g., archived) files from operation 604 can be eliminated from consideration in a deduplication sampling phase.

After operation 606, process flow 600 moves to operation 608.

Operation 608 depicts performing a sampling phase on the second group of files, wherein the sampling phase identifies a first group of blocks, and wherein the first group of blocks corresponds to duplicate file system blocks among the second group of files. That is, a deduplication sampling phase can be performed.

After operation 608, process flow 600 moves to operation 610.

Operation 610 depicts identifying a second group of blocks that correspond to the first group of files. That is, data blocks of files that are to be modified (from operation 604) can be identified.

After operation 610, process flow 600 moves to operation 612.

Operation 612 depicts removing any blocks from the first group of blocks that have a respective duplicate in the second group of blocks to produce a third group of blocks. That is, the blocks of operation 610 can be removed from an index table that is used in performing a deduplication.

After operation 612, process flow 600 moves to operation 614.

Operation 614 depicts performing the deduplication operation on the third group of blocks. That is, a deduplication can be performed on blocks in the index table (after blocks have been removed from the index table in operation 612).

After operation 614, process flow 600 moves to 616, where process flow 600 ends.

FIG. 7 illustrates an example process flow 700 that can facilitate deduplication based on archival schedule, in accordance with an embodiment of this disclosure. In some examples, one or more embodiments of process flow 700 can be implemented by deduplication based on archival schedule component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts sending, to a component that is configured to perform the other operation, an application programming interface command requesting the files that are scheduled to be modified within the next defined amount of time. That is, identifying the first group of files in operation 604 of FIG. 6 can comprise sending an API request to a component that performs the other operation In some examples, the application programming interface command identifies a value for the next defined amount of time. That is, the API call can include a parameter that is a value for the next "N" hours, where N identifies how far to look ahead in determining whether the files will be modified by the other operation.

In some examples, the component is configured to analyze a stored policy to determine the first group of files. That is, determining which files will be modified can comprise checking a policy (e.g., an archive policy for an archive operation) that indicates which files will be modified.

In some examples, the component is configured to analyze a first stored policy to determine a third group of files, wherein the component is configured to analyze a second stored policy to determine a fourth group of files, and wherein the first group of files comprises a combination of the third group of files and the fourth group of files. That is, there can be multiple policies (e.g., archive policies), and all policies implemented by the component can be analyzed to determine which files will be modified.

After operation 704, process flow 700 moves to operation 706.

Operation 706 depicts receiving an indication of the first group of files from the component. That is, in response to sending the API request in operation 704, the component can return an identification of the first group of files (e.g., respective file system paths to each of the files of the first group of files).

After operation 706, process flow 700 moves to 708, where process flow 700 ends.

Figure 8:
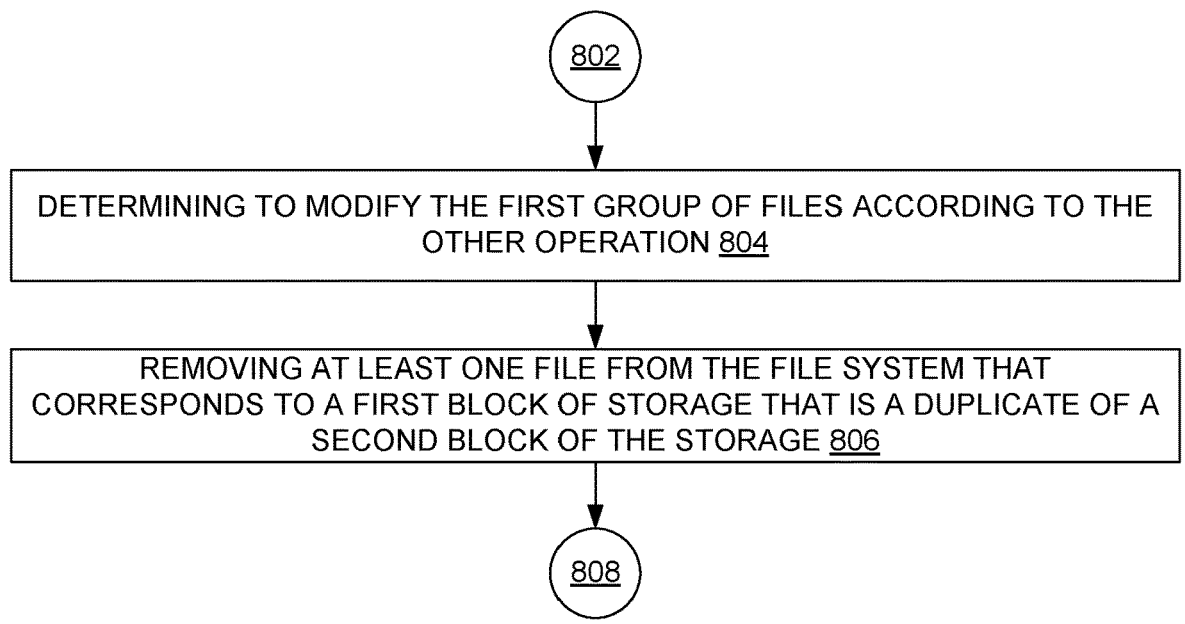
FIG. 8 illustrates another example process flow that can facilitate deduplication based on archival schedule, in accordance with an embodiment of this disclosure.

FIG. 8 illustrates an example process flow 800 that can facilitate deduplication based on archival schedule, in accordance with an embodiment of this disclosure. In some examples, one or more embodiments of process flow 800 can be implemented by deduplication based on archival schedule component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts determining to modify the first group of files according to the other operation. That is, the deduplication and the other operation can operate on the same files—e.g., the other operation can modify (e.g., archive) a file that would otherwise be deduplicated by the deduplication operation.

After operation 804, process flow 800 moves to operation 806.

Operation 806 depicts removing at least one file from the file system that corresponds to a first block of storage that is a duplicate of a second block of the storage. That is, the other operation can cause removing a file, such as by deleting and/or archiving it.

After operation 806, process flow 800 moves to 808, where process flow 800 ends.

Figure 9:
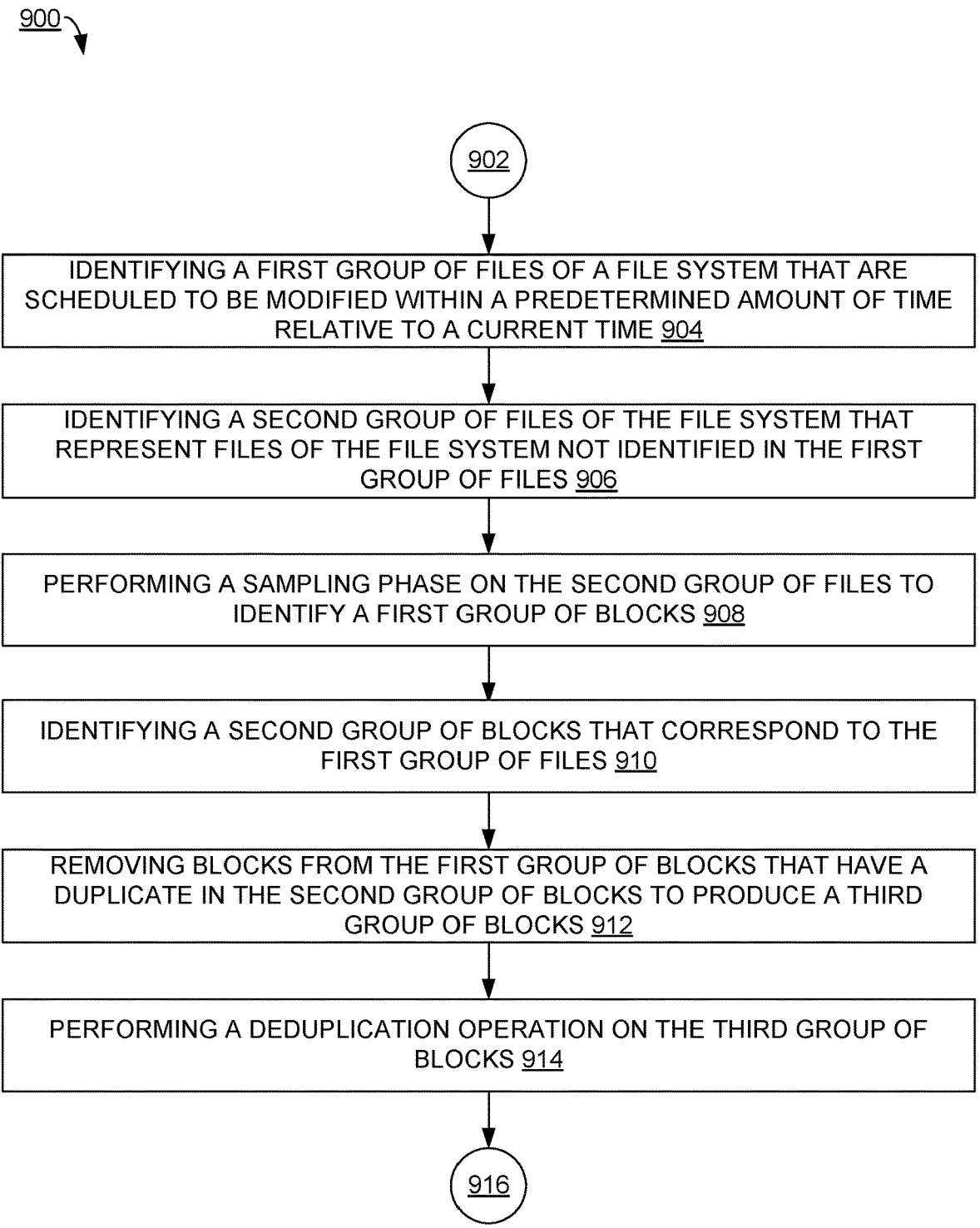
FIG. 9 illustrates another example process flow that can facilitate deduplication based on archival schedule, in accordance with an embodiment of this disclosure.

FIG. 9 illustrates an example process flow 900 that can facilitate deduplication based on archival schedule, in accordance with an embodiment of this disclosure. In some examples, one or more embodiments of process flow 900 can be implemented by deduplication based on archival schedule component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts identifying a first group of files of a file system that are scheduled to be modified within a predetermined amount of time relative to a current time. In some examples, operation 904 can be implemented in a similar manner as operation 604 of FIG. 6.

In some examples, identifying the first group of files is performed in response to determining to perform the deduplication operation. That is, determining to perform a deduplication can initiate process flow 1000.

In some examples, the file system is a first file system, and modifying the first group of files comprises copying the first group of files to at least one second file system, and deleting the first group of files from the first file system. This can be, for example, an archive operation where certain files are archived to other storage, then deleted locally.

After operation 904, process flow 900 moves to operation 906.

Operation 906 depicts identifying a second group of files of the file system that represent files of the file system not identified in the first group of files. In some examples, operation 906 can be implemented in a similar manner as operation 606 of FIG. 6.

After operation 906, process flow 900 moves to operation 908.

Operation 908 depicts performing a sampling phase on the second group of files to identify a first group of blocks. In some examples, operation 908 can be implemented in a similar manner as operation 608 of FIG. 6.

In some examples, the first group of blocks corresponds to common file system blocks among the second group of files.

After operation 908, process flow 900 moves to operation 910.

Operation 910 depicts identifying a second group of blocks that correspond to the first group of files. In some examples, operation 910 can be implemented in a similar manner as operation 610 of FIG. 6.

After operation 910, process flow 900 moves to operation 912.

Operation 912 depicts removing blocks from the first group of blocks that have a duplicate in the second group of blocks to produce a third group of blocks. In some examples, operation 912 can be implemented in a similar manner as operation 612 of FIG. 6.

After operation 912, process flow 900 moves to operation 914.

Operation 914 depicts performing a deduplication operation on the third group of blocks. In some examples, operation 914 can be implemented in a similar manner as operation 614 of FIG. 6.

In some examples, performing the deduplication operation on the third group of blocks comprises removing a first block of the third group of blocks from the file system. In some examples, performing the deduplication operation on the third group of blocks comprises storing a pointer to a second block of the third group of blocks, where the pointer corresponds to the first block, and where the second block stores same data as the first block. That is, a deduplication operation can comprise replacing duplicate blocks with a pointer to one block.

After operation 914, process flow 900 moves to 916, where process flow 900 ends.

FIG. 10 illustrates an example process flow 1000 that can facilitate deduplication based on archival schedule, in accordance with an embodiment of this disclosure. In some examples, one or more embodiments of process flow 1000 can be implemented by deduplication based on archival schedule component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts identifying a first group of files of a file system that are scheduled to be modified within a specified amount of time relative to a current time. In some examples, operation 1004 can be implemented in a similar manner as operation 604 of FIG. 6.

In some examples, the deduplication operation is performed by a deduplication component, a component is scheduled to modify the first group of files, and the component is configured to modify the first group of files independently of the deduplication component. That is, the component and the deduplication component can run on independent schedules. The component can be configured to inform the deduplication component of what files it will soon modify, and while doing this it can continue to modify files on its own schedule.

In some examples, the first group of files of a file system are scheduled to be modified by an archive operation.

In some examples, the first group of files of a file system are scheduled to be modified by another operation. In such examples, operation 1004 can comprise sending, to the comp application programming interface command requesting the files that are scheduled to be modified within the next defined amount of time, wherein the application programming interface command identifies a first file system path for the files, and wherein the first file system path indicates excluding files stored in a second file system path, and receiving, from the component, an indication of the first group of files.

After operation 1004, process flow 1000 moves to operation 1006.

Operation 1006 depicts identifying a second group of files of the file system that does not comprise the first group of files. In some examples, operation 1006 can be implemented in a similar manner as operation 606 of FIG. 6.

After operation 1006, process flow 1000 moves to operation 1008.

Operation 1008 depicts identifying a first group of blocks based on performing sampling on the second group of files. In some examples, operation 1008 can be implemented in a similar manner as operation 608 of FIG. 6.

After operation 1008, process flow 1000 moves to operation 1010.

Operation 1010 depicts identifying a second group of blocks that correspond to the first group of files. In some examples, operation 1010 can be implemented in a similar manner as operation 610 of FIG. 6.

After operation 1010, process flow 1000 moves to operation 1012.

Operation 1012 depicts removing blocks from the first group of blocks that have a duplicate block in the second group of blocks to produce a third group of blocks. In some examples, operation 1012 can be implemented in a similar manner as operation 612 of FIG. 6.

After operation 1012, process flow 1000 moves to operation 1014.

Operation 1014 depicts performing a deduplication operation on the third group of blocks. In some examples, operation 1014 can be implemented in a similar manner as operation 614 of FIG. 6.

In some examples, the deduplication operation is a first deduplication operation, and performing the first deduplication operation on the third group of blocks comprises consuming fewer processing resources relative to performing a second deduplication operation on a fourth group of blocks that corresponds to the first group of files and the second group of files. That is, the present techniques can be implemented to consume fewer processing resources as compared to a deduplication process that is unaware of other processes that will modify files.

After operation 1014, process flow 1000 moves to 1016, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102 and/or archival storage 106 of FIG. 1.

In some examples, computing environment 1100 can implement one or more embodiments of the process flows of FIGS. 3-10 to facilitate deduplication based on archival schedule.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the processor, comprising instructions that, in response to execution by the at least one processor, cause the system to perform operations, comprising:
   in response to determining to perform a deduplication operation on files of a file system, identifying a first group of files that are scheduled to be modified by another operation within a next defined amount of time, wherein the other operation differs from the deduplication operation;
   removing the first group of files from the files of the file system with respect to the deduplication operation to produce a second group of files of the file system;
   performing a sampling phase on the second group of files, wherein the sampling phase identifies a first group of blocks, and wherein the first group of blocks corresponds to duplicate file system blocks among the second group of files;
   identifying a second group of blocks that correspond to the first group of files;
   removing any blocks from the first group of blocks that have a respective duplicate in the second group of blocks to produce a third group of blocks; and
   performing the deduplication operation on the third group of blocks.

2. The system of claim 1, wherein identifying the first group of files comprises:
   receiving an indication of the first group of files from a component that is configured to perform the other operation.

3. The system of claim 2, wherein the operations further comprise:
   before receiving the indication of the first group of files, sending, to the component, an application programming interface command requesting the files that are scheduled to be modified within the next defined amount of time.

4. The system of claim 3, wherein the application programming interface command identifies a value for the next defined amount of time.

5. The system of claim 2, wherein the component is configured to analyze a stored policy to determine the first group of files.

6. The system of claim 2, wherein the component is configured to analyze a first stored policy to determine a third group of files, wherein the component is configured to analyze a second stored policy to determine a fourth group of files, and wherein the first group of files comprises a combination of the third group of files and the fourth group of files.

7. The system of claim 1, wherein identifying the first group of files comprises:
   identifying respective file system paths of respective files of the first group of files.

8. The system of claim 1, wherein a component is scheduled to modify the first group of files, and wherein the component is configured to perform operations on a defined schedule.

9. The system of claim 1, wherein the operations further comprise:
modifying the first group of files according to the other operation, resulting in removal of at least one file from the file system that corresponds to a first block of storage that is a duplicate of a second block of the storage.

10. A method, comprising:
in response to determining to perform a deduplication operation on files of a file system, identifying, by a system comprising at least one processor, a first group of files that are scheduled to be modified by another operation within a next defined amount of time, wherein the other operation differs from the deduplication operation;
removing, by the system, the first group of files from the files of the file system with respect to the deduplication operation to produce a second group of files of the file system;
performing, by the system, a sampling phase on the second group of files, wherein the sampling phase identifies a first group of blocks, and wherein the first group of blocks corresponds to duplicate file system blocks among the second group of files;
identifying, by the system, a second group of blocks that correspond to the first group of files;
removing, by the system, any blocks from the first group of blocks that have a respective duplicate in the second group of blocks to produce a third group of blocks; and
performing, by the system, the deduplication operation on the third group of blocks.

11. The method of claim 10, wherein the first group of blocks corresponds to common file system blocks among the second group of files.

12. The method of claim 10, wherein identifying the first group of files is performed in response to determining, by the system, to perform the deduplication operation.

13. The method of claim 10, wherein the file system is a first file system, and wherein modifying the first group of files comprises:
copying the first group of files to at least one second file system; and
deleting the first group of files from the first file system.

14. The method of claim 10, wherein performing the deduplication operation on the third group of blocks comprises:
removing a first block of the third group of blocks from the file system.

15. The method of claim 14, wherein performing the deduplication operation on the third group of blocks comprises:
storing a pointer to a second block of the third group of blocks, wherein the pointer corresponds to the first block, and wherein the second block stores same data as the first block.

16. A non-transitory computer-readable medium comprising instructions that, in response to execution, cause a system comprising at least one processor to perform operations, comprising:
in response to determining to perform a deduplication operation on files of a file system, identifying a first group of files that are scheduled to be modified by another operation within a next defined amount of time, wherein the other operation differs from the deduplication operation;
removing the first group of files from the files of the file system with respect to the deduplication operation to produce a second group of files of the file system;
performing a sampling phase on the second group of files, wherein the sampling phase identifies a first group of blocks, and wherein the first group of blocks corresponds to duplicate file system blocks among the second group of files;
identifying a second group of blocks that correspond to the first group of files;
removing any blocks from the first group of blocks that have a respective duplicate in the second group of blocks to produce a third group of blocks; and
performing the deduplication operation on the third group of blocks.

17. The non-transitory computer-readable medium of claim 16, wherein the deduplication operation is performed by a deduplication component, wherein a component is scheduled to modify the first group of files, and wherein the component is configured to modify the first group of files independently of the deduplication component.

18. The non-transitory computer-readable medium of claim 16, wherein the deduplication operation is a first deduplication operation, wherein performing the first deduplication operation on the third group of blocks comprises consuming fewer processing resources relative to performing a second deduplication operation on a fourth group of blocks that corresponds to the first group of files and the second group of files.

19. The non-transitory computer-readable medium of claim 16, wherein the first group of files of a file system are scheduled to be modified by an archive operation.

20. The non-transitory computer-readable medium of claim 16, wherein the first group of files of a file system are scheduled to be modified by another operation, and wherein the operations further comprise:
sending, to the component, an application programming interface command requesting the files that are scheduled to be modified within the next defined amount of time, wherein the application programming interface command identifies a first file system path for the files, and wherein the first file system path indicates excluding files stored in a second file system path; and
receiving, from the component, an indication of the first group of files.

* * * * *